(12) United States Patent
Yun et al.

(10) Patent No.: US 11,522,230 B2
(45) Date of Patent: Dec. 6, 2022

(54) BATTERY PACK CONNECTOR

(71) Applicant: LG Chem, Ltd., Seoul (KR)

(72) Inventors: Sun-Woo Yun, Daejeon (KR); Jang-Soo Ock, Daejeon (KR)

(73) Assignee: LG Energy Solution, Ltd.

( * ) Notice: Subject to any disclaimer, the term of this patent is extended or adjusted under 35 U.S.C. 154(b) by 212 days.

(21) Appl. No.: 16/631,628

(22) PCT Filed: Feb. 12, 2019

(86) PCT No.: PCT/KR2019/001701
§ 371 (c)(1),
(2) Date: Jan. 16, 2020

(87) PCT Pub. No.: WO2019/160302
PCT Pub. Date: Aug. 22, 2019

(65) Prior Publication Data
US 2020/0176826 A1 Jun. 4, 2020

(30) Foreign Application Priority Data

Feb. 14, 2018 (KR) .......................... 10-2018-0018596

(51) Int. Cl.
*H01M 10/42* (2006.01)
*H01R 13/648* (2006.01)
*H01R 27/02* (2006.01)

(52) U.S. Cl.
CPC ........ *H01M 10/425* (2013.01); *H01R 13/648* (2013.01); *H01R 27/02* (2013.01);
(Continued)

(58) Field of Classification Search
CPC ....... H01M 10/425; H01M 2010/4271; H01M 2010/4278; H01R 13/648; H01R 27/02; H01R 2201/26
See application file for complete search history.

(56) References Cited

U.S. PATENT DOCUMENTS 4,863,401 A * 9/1989 Talend ............... H01R 13/7197
439/607.43
5,304,964 A 4/1994 DiMarco
(Continued)

FOREIGN PATENT DOCUMENTS

| CN | 102904093 A | 1/2013 |
| CN | 103022404 A | 4/2013 |

(Continued)

OTHER PUBLICATIONS

International Search Report for Application No. PCT/KR2019/001701, dated May 15, 2019, pp. 1-2.
(Continued)

*Primary Examiner* — Matthew J Merkling
(74) *Attorney, Agent, or Firm* — Lerner, David, Littenberg, Krumholz & Mentlik, LLP

(57) ABSTRACT

Provided is a battery pack connector having a simple structure and capable of effectively preventing noise from flowing into or out of a battery pack. The battery pack connector includes: a communication connecting unit configured to be connectable to a communication wire for exchanging information with the battery management system; and a power supply connecting unit configured to be connectable to a power supply wire for supplying driving power to the battery management system and having at least a portion including a noise blocking material.

18 Claims, 10 Drawing Sheets

(52) U.S. Cl.
CPC ............... *H01M 2010/4271* (2013.01); *H01M 2010/4278* (2013.01); *H01M 2220/20* (2013.01); *H01R 2201/26* (2013.01)

(56) References Cited

U.S. PATENT DOCUMENTS

| | | | |
|---|---|---|---|
| 6,190,206 | B1 | 2/2001 | Yang |
| 9,172,187 | B2 * | 10/2015 | Miyakawa ......... H01R 13/7193 |
| 9,960,531 | B2 * | 5/2018 | Poncini ................. H01R 4/023 |
| 2002/0057026 | A1 | 5/2002 | Taniguchi |
| 2009/0258282 | A1 | 10/2009 | Harada et al. |
| 2010/0062643 | A1 | 3/2010 | Kumagai et al. |
| 2014/0295216 | A1 * | 10/2014 | Matsuda ............... H01M 50/20 |
| | | | 429/7 |
| 2014/0349520 | A1 | 11/2014 | Aizawa |
| 2015/0244194 | A1 | 8/2015 | Tabuchi et al. |
| 2017/0077722 | A1 | 3/2017 | Jung |
| 2017/0200929 | A1 * | 7/2017 | Acikgoez ............ H01M 10/425 |
| 2017/0256892 | A1 * | 9/2017 | Maesoba ............ H01R 13/6589 |
| 2018/0026248 | A1 * | 1/2018 | Fehner ................. H01R 13/405 |
| | | | 429/161 |
| 2018/0269440 | A1 | 9/2018 | Lee et al. |
| 2019/0148876 | A1 * | 5/2019 | Milroy ................... H01R 13/53 |
| | | | 439/522 |
| 2020/0028202 | A1 * | 1/2020 | Miyoshi ................ H01M 10/48 |
| 2021/0094439 | A1 * | 4/2021 | Okachi ............... H01M 50/505 |

FOREIGN PATENT DOCUMENTS

| | | |
|---|---|---|
| CN | 104183991 A | 12/2014 |
| EP | 0772260 A1 | 5/1997 |
| EP | 0948100 A1 | 10/1999 |
| JP | S56170884 U | 12/1981 |
| JP | 406076886 A | 3/1994 |
| JP | H07220528 A | 8/1995 |
| JP | 3073189 U | 11/2000 |
| JP | 2001319735 A | 11/2001 |
| JP | 2007335277 A | 12/2007 |
| JP | 2009252460 A | 10/2009 |
| JP | 2010113925 A | 5/2010 |
| JP | 4482782 B2 | 6/2010 |
| JP | 2015053202 A | 3/2015 |
| JP | 5850822 B2 | 2/2016 |
| JP | 6193150 B2 | 9/2017 |
| KR | 101278229 B1 | 6/2013 |
| KR | 20150110427 A | 10/2015 |
| KR | 20160049895 A | 5/2016 |
| KR | 101729655 B1 | 5/2017 |
| KR | 20170068406 A | 6/2017 |

OTHER PUBLICATIONS

European Search Report for Application No. 19754154.3, dated Nov. 24, 2020, 8 pages.
Search Report dated Dec. 17, 2021 from Office Action for Chinese Application No. 201980004383.0 dated Jan. 10, 2022. 3 pgs.

* cited by examiner

BATTERY PACK CONNECTOR

CROSS-REFERENCE TO RELATED APPLICATIONS

The present application is a national phase entry under 35 U.S.C. § 371 of International Application No. PCT/KR2019/001701 filed Feb. 12, 2019, published in Korean, which claims priority from Korean Patent Application No. 10-2018-0018596 filed Feb. 14, 2018, all of which are incorporated herein by reference.

TECHNICAL FIELD

The present disclosure relates to a pack connector, and more particularly, to a battery pack connector provided in a pack case of a battery pack and configured to be connected to an external device, and a battery pack, a vehicle, and the like including the battery pack connector.

BACKGROUND ART

Currently commercialized secondary batteries include nickel cadmium batteries, nickel hydrogen batteries, nickel zinc batteries, lithium secondary batteries, etc. and the lithium secondary batteries thereamong are receiving attention according advantages of free charging/discharging, a very low self-discharge rate, and high energy density since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery case, sealing and accommodating the electrode assembly with an electrolyte solution.

Generally, the lithium secondary battery may be classified into a can type secondary battery, in which the electrode assembly is embedded in a metal can, and a pouch type secondary battery, in which the electrode assembly is embedded in a pouch of an aluminum laminate sheet, based on a shape of the exterior material.

Recently, the secondary battery is widely used not only in a small-sized apparatus, such as a portable electronic device, but also in medium- and large-sized apparatuses, such as a vehicle or an energy storage system (ESS), for driving or energy storage. The secondary battery is mounted on the medium- and large-sized apparatuses by being included in a battery pack, and at this time, a large number of secondary batteries are included in the battery pack and are electrically connected to each other to increase the capacity and output of the battery pack. Here, the plurality of secondary batteries are accommodated inside one module case to configure one battery module, and at least one battery module is accommodated inside one pack case to configure one battery pack.

The battery pack may be electrically connected to another external device to exchange power, data, and the like. However, when noise flows into the battery pack during this process, not only the battery pack, but also other electronic equipment connected to the battery pack may be adversely affected. For example, in case of the battery pack mounted on a vehicle, noise may flow into the battery pack by another device in the vehicle, such as an inverter or the like.

In this case, the flowed noise may cause malfunction or interfere with an accurate operation in various electronic devices inside the battery pack, such as a battery management system (BMS), a current sensor, a temperature sensor, a relay, and the like. Also, the noise flowed to the battery pack may cause malfunction again by affecting another external electronic device connected to the battery pack, such as a radio or navigation device of the vehicle.

In particular, the noise generated in the inverter or the like of the vehicle may flow into the battery pack through a connector provided in the battery pack. Here, the connector may be electrically connected to an electronic component, such as the BMS, through a wire, and the noise flowed from the inverter or the like may be flowed into the battery pack through the connector and the wire, thereby causing several problems.

In order to solve such problems of the related art, a technology in which a filter element such as a ferrite core filter is wound around the wire connected to the connector, or the like, and used has been proposed. However, in this case, energy density of the battery pack is deteriorated and arrangement between internal components of the battery pack is not easy. In other words, since the filter element itself has certain volume, volume of the battery pack is increased or an occupied space of another component, such as the secondary battery or the like, is decreased as much as a space occupied by the filter element. Also, when the filter element is positioned inside the battery pack, the filter element needs to be fixed. In this case, an internal space of the battery pack is decreased and a structure thereof is complicated in terms of preparing a fixing structure of the filter element. Moreover, the wire is often wound at least once around the ferrite core filter, and in this case, manufacturing processes become complicated and an internal design becomes difficult.

SUMMARY

Technical Problem

The present disclosure is designed to solve the problems of the related art, and therefore the present disclosure is directed to providing a battery pack connector having a simple structure and capable of effectively preventing noise from flowing into or out of a battery pack, and a battery pack and vehicle including the battery pack connector.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack connector located in a pack case of a battery pack including a battery management system, the battery pack connector including: a communication connector configured to be connectable to a communication wire for exchanging information with the battery management system; and a power supply connector configured to be connectable to a power supply wire for supplying driving power to the battery management system and having at least a portion including a noise blocking material.

Here, the power supply connector may include a power supply housing including the noise blocking material, and at least a first power supply conductor including a metal material, embedded inside the power supply housing, and having a first end and a second end exposed to an outside of the power supply housing.

Also, the at least one power supply conductor may be bent at least once inside the power supply housing.

Also, the at least one power supply conductor may be bent at least 90° inside the power supply housing.

In addition, the power supply connector may include at least a second power supply conductor, and the first and second power supply conductors may be are arranged at different locations in an up-and-down direction, wherein each of the first and second power supply conductors may be bent in the up-and-down direction and located at different locations in a horizontal direction.

Also, the power supply connector may include at least a second power supply conductor inside the power supply housing, wherein of the first and second power supply conductors may have bent shapes to form uneven portions.

Also, the first power supply conductor may be bent three-dimensionally inside the power supply housing.

In addition, the communication connector may include a communication housing including a polymer material, and at least one communication conductor including a metal material, embedded inside the communication housing, and having a first end and a second end exposed to an outside of the power supply housing.

In another aspect of the present disclosure, there is also provided a battery pack including the battery pack connector of any of the embodiments described herein.

In another aspect of the present disclosure, there is also provided a vehicle including the battery pack of any of the embodiments described herein.

Advantageous Effects

According to one aspect of the present disclosure, noise can be effectively prevented from flowing into or out of a battery pack through a connector.

Also, according to another aspect of the present disclosure, volume of a battery pack can be prevented from being increased or energy density can be prevented from being decreased when preparing a noise blocking configuration.

Also, according to another aspect of the present disclosure, an internal structure of a battery pack can be prevented from becoming complicated or manufacturing processes can be facilitated.

In addition, according to another aspect of the present disclosure, a configuration that enables a communication line, such as a controller area network (CAN) communication line, to avoid a noise blocking configuration can be easily achieved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
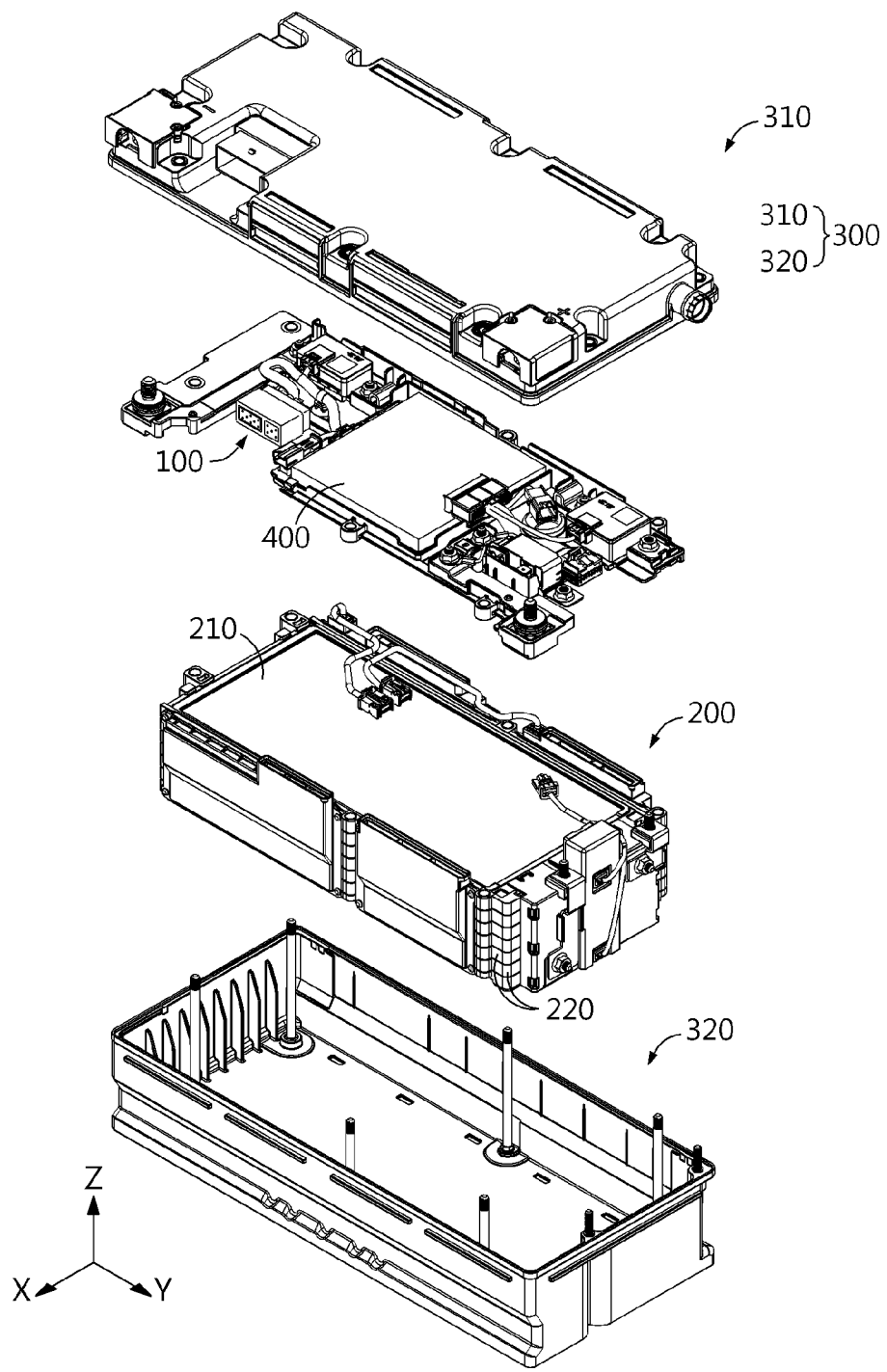
FIG. 1 is an exploded perspective view schematically showing a configuration of a battery pack including a battery pack connector, according to an embodiment of the present disclosure.
Figure 2:
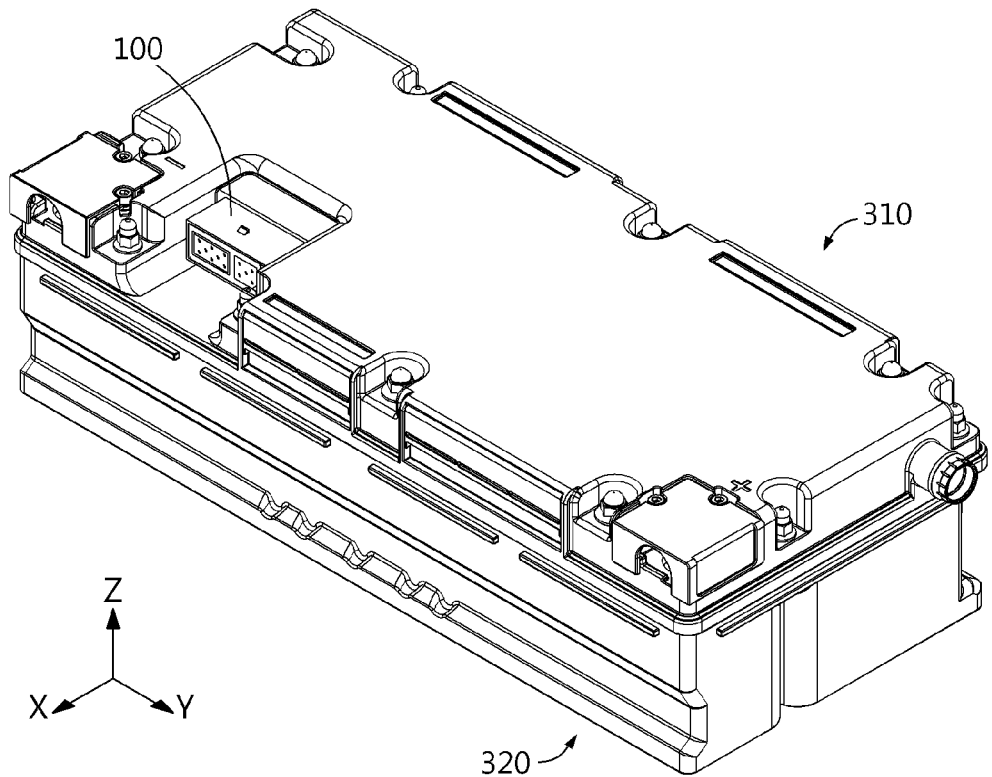
FIG. 2 is a combined perspective view of the configuration of FIG. 1.

FIG. 1 is an exploded perspective view schematically showing a configuration of a battery pack 100 including a battery pack connector, according to an embodiment of the present disclosure, and FIG. 2 is a combined perspective view of the configuration of FIG. 1.

Referring to FIGS. 1 and 2, a battery pack including the battery pack connector 100 according to the present disclosure may include, together with the battery pack connector 100 according to the present disclosure, a cell assembly 200, a pack case 300, and a battery management system 400.

Here, the cell assembly 200 may include a plurality of secondary batteries 210. The secondary battery 210 is a component storing or discharging electric energy via charging and discharging, and in particular, may be in a form of a pouch type secondary battery. Such a secondary battery 210 may include an electrode assembly, an electrolyte, and a pouch exterior material. Moreover, the secondary battery 210 according to the present disclosure may be a lithium secondary battery. The cell assembly 200 of the battery pack according to the present disclosure may employ various types of secondary batteries well-known at the time of application of the present disclosure.

The plurality of secondary batteries 210 may be included in the battery pack. In particular, the plurality of secondary batteries 210 may be arranged in an up-and-down direction while being laid such that wide surfaces face top and bottom.

A cartridge 220 may be configured to accommodate the secondary battery in an internal space, and in particular, surround a peripheral portion of the secondary battery 210 at the outer side. Moreover, the cartridge 220 may have an approximately quadrangular ring shape protect the outer side of the secondary battery 210. Also, the cartridges 220 may be configured to be stacked on each other and may accommodate the secondary batteries 210 in the internal space while being stacked on each other, thereby stably maintaining a stacked state of the secondary batteries 210. Also, a center portion of the cartridge 220 may include a cooling plate of a heat conductive material.

The pack case 300 may have a space therein and accommodate components, such as the cell assembly 200 and the battery management system 400, in the internal space. In particular, as shown in the drawings, the pack case 300 includes an upper case 310 and a lower case 320, and the upper case 310 and the lower case 320 may be configured to be combined with each other. The pack case 300 may include a plastic material to obtain electric insulation, a light weight, rigidity, and the like, but may at least partially include another material, such as a metal material or the like, to enhance an effect of cooling, rigidity, or the like.

The battery management system 400 is a management device controlling charging and discharging operations of the battery pack in overall, and is generally referred to as BMS. Such a battery management system 400 is a type of an electronic component generally included in the battery pack, and the present disclosure is not limited by a specific type, shape, feature, or the like of the battery management system 400. In other words, the battery pack to which a connector of the present disclosure is applied may employ various battery management systems well-known at the time of application of the present disclosure, and detailed descriptions of the battery management system 400 will be omitted.

The electronic components included in the battery pack further include, in addition to the battery management system 400, a current sensor, a relay, and a fuse or the like. Here, the current sensor is a component sensing charging and discharging currents of the battery pack, and the relay is a switching component selectively closing or opening charging and discharging paths through which the charging and discharging currents of the battery pack flow. Also, the fuse is a component provided on the charging and discharging paths of the battery pack and blocking flows of the charging and discharging currents by being melted and broken when an abnormal situation occurs in the battery pack. Such a current sensor, relay, and fuse may exchange information with the battery management system 400, and may be controlled by the battery management system. The electronic components, such as the current sensor, the relay, and the fuse, in addition to the battery management system 400, may be accommodated inside the battery pack while being mounted on one plate, as shown in FIG. 1. For example, the plate on which the electronic components are mounted may be located at a top portion of the cell assembly 200.

The battery pack connector 100 according to the present disclosure may be located at the pack case of the battery pack and configured to be electrically connected to another device outside the battery pack. In this regard, the battery pack connector 100 may be configured such that at least a portion, in particular, a connection terminal of an external device, is exposed to the outside of the battery pack.

For example, as shown in FIGS. 1 and 2, the battery pack connector 100 according to the present disclosure may be located at the upper case 310 and configured such that a portion is exposed to the outside.

The battery pack connector 100 may function as a path enabling driving power to flow into or out of another external device. Also, the battery pack connector 100 may function as a path performing communication with the other external device.

In particular, the battery pack to which the battery pack connector 100 according to the present disclosure is applied may include the electronic component, such as the battery management system. Also, the battery pack connector 100 according to the present disclosure may transmit driving power or a communication signal by being connected to such an electronic component, such as the battery management system. A specific configuration of the battery pack connector 100 will be described in detail with reference to FIGS. 3 and 4.

Figure 3:
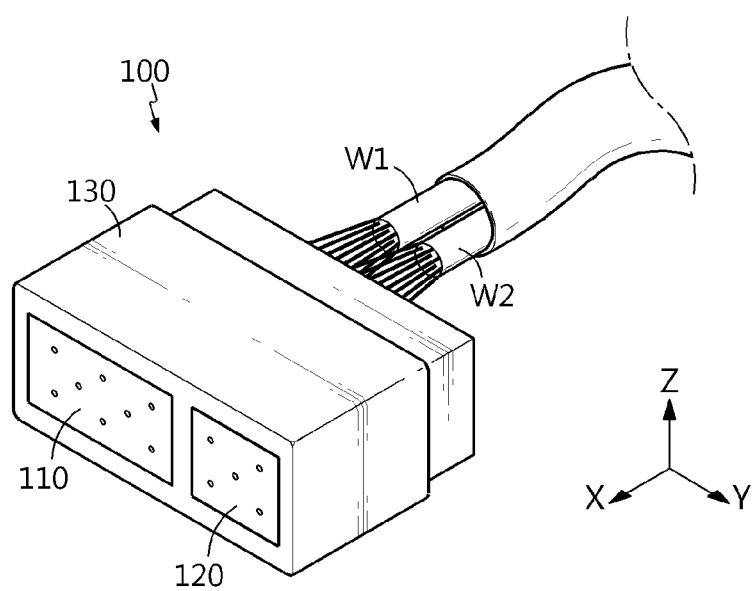
FIG. 3 is a perspective view showing a schematic configuration of a battery pack connector, according to an embodiment of the present disclosure.
Figure 4:
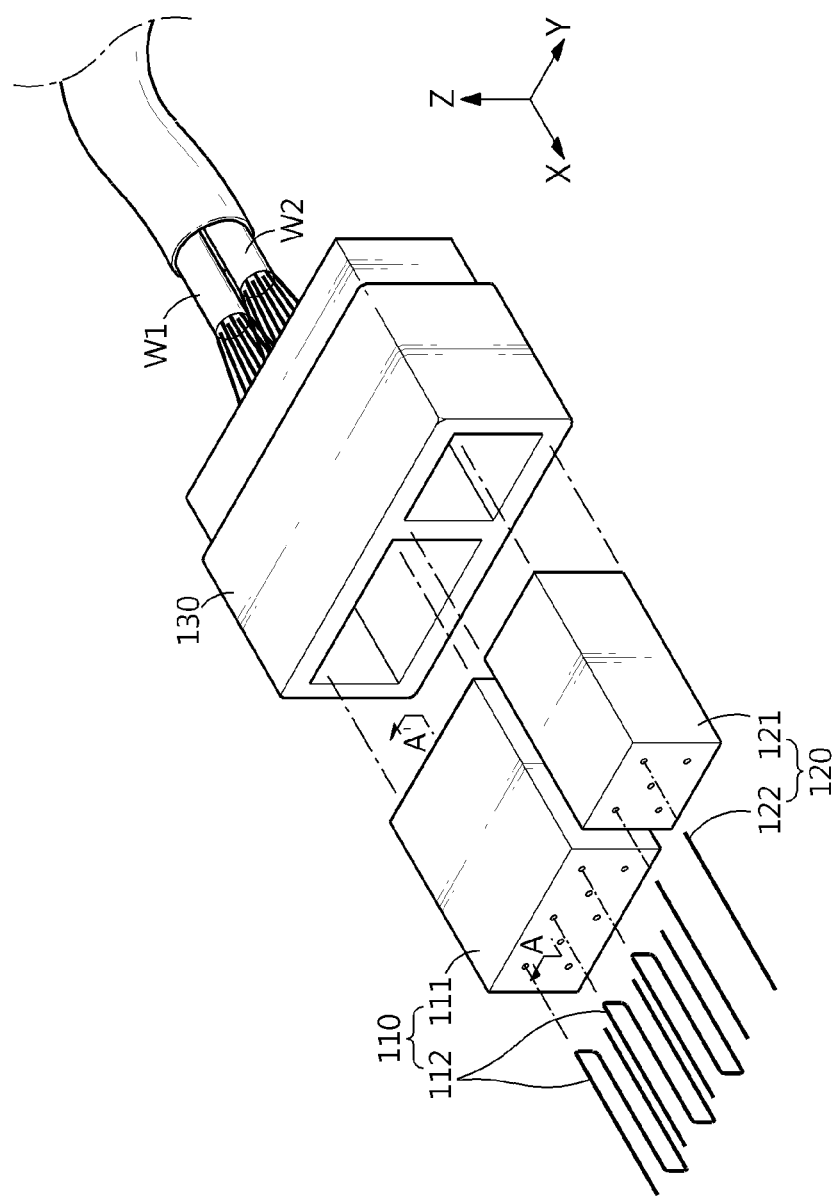
FIG. 4 is a perspective view in which a partial configuration of FIG. 3 is separated.

FIG. 3 is a perspective view showing a schematic configuration of the battery pack connector 100, according to an embodiment of the present disclosure, and FIG. 4 is a perspective view in which a partial configuration of FIG. 3 is separated. In particular, in FIG. 4, some conductors of each connecting unit are exposed outside a housing for convenience of description.

Referring to FIGS. 3 and 4, the battery pack connector 100 according to the present disclosure may include a communication connecting unit 120 and a power supply connecting unit 110.

The communication connecting unit 120 may be a configuration provided in the battery pack connector 100 such that a component inside the battery pack and a component outside the battery pack exchange a communication signal. For example, when the battery pack is provided in a vehicle, an electronic control unit (ECU) of the vehicle and a BMS of the battery pack may communicate with each other via the communication connecting unit 120.

In this regard, the communication connecting unit 120 may be configured to be connectable to a communication wire w2 provided inside the battery pack. In particular, the communication wire w2 may be a signal line connected to the battery management system (BMS) to exchange information with the battery management system. In this case, the communication wire may have one end connected to the communication connecting unit 120 and the other end connected to the battery management system. For example, the battery management system may communicate with the ECU of the vehicle via the communication wire and the communication connecting unit 120.

The power supply connecting unit 110 may be a configuration provided in the battery pack connector 100 such that driving power is exchanged between the component inside the battery pack and the component outside the battery pack. For example, when the battery pack is provided in the vehicle, driving power of the internal component may be supplied from a lead storage battery or the like of the vehicle through the power supply connecting unit 110.

In this regard, the power supply connecting unit 110 may be configured to be connectable to a power supply wire w1 provided inside the battery pack. In particular, the power supply wire may be a power supply line connected to the battery management system 400 to supply driving power to the battery management system 400. In this case, the power supply wire w1 may have one end connected to the power supply connecting unit 110 and the other end connected to the battery management system 400. For example, the battery management system 400 may receive driving power from the lead storage battery of the vehicle via the power supply connecting unit 110 and the power supply wire w1.

In particular, in the battery pack connector 100 according to the present disclosure, the power supply connecting unit 110 may have at least a portion including a noise blocking material. In relation to the battery pack, noise may be generated from the battery pack itself or various electronic devices of an apparatus where the battery pack is mounted. Also, such noise may flow into the battery pack through various paths, such as the battery pack connector 100, a pack terminal, and the like. Also, the noise flowed into the pack as such may be transmitted outside the pack again through the battery pack connector 100. However, according to the configuration of the present disclosure, the pack connector itself includes the noise blocking material, and thus the noise may be blocked or restricted from flowing in or out through the pack connector.

Moreover, according to such an aspect of the present disclosure, since a noise blocking material is embedded in a connector provided in a pack case, it is not necessary to provide another configuration for blocking noise, such as a ferrite core filter or the like, inside a battery pack. Thus, according to such an aspect of the present disclosure, a space occupied by the ferrite core filter or the like may be reduced, and a separate configuration for fixing the ferrite core filter or the like is not required. Accordingly, the battery pack may be easily manufactured and an internal space may not be complicated. Moreover, according to such an aspect of the present disclosure, since a configuration for blocking noise is provided in a connector, a noise blocking effect may be further enhanced compared to when a noise blocking configuration is provided in the middle of a wire.

Meanwhile, the noise blocking material included in the power supply connecting unit 110 may be various noise blocking materials well-known at the time of application of the present disclosure. Representatively, the power supply connecting unit 110 may include a soft magnetic material as the noise blocking material. Furthermore, the noise blocking material may include a ceramic material. In particular, the power supply connecting unit 110 may include a ferrite material as the noise blocking material.

Preferably, the power supply connecting unit 110 may include a power supply housing 111 and a power supply conductor 112.

The power supply housing 111 may include an electric insulating material such as not to be electrically conducted with the power supply conductor 112 therein. In particular, the power supply housing 111 may include a noise blocking material. For example, the power supply housing 111 may include a ferrite core material. Here, the power supply housing 111 may be configured in a form in which the noise blocking material (ferrite) is included inside a case of another material, for example, a plastic material. Alternatively, the power supply housing 111 may include only the noise blocking material (ferrite) in overall.

The power supply housing 111 includes the power supply conductor 112 therein, and may have various shapes to surround the power supply conductor 112. For example, the power supply housing 111 may have an approximate rectangular parallelepiped shape as shown in FIG. 4. However, the present disclosure is not limited by such a specific shape of the power supply housing 111. For example, the power supply housing 111 may have a cylindrical shape.

The power supply conductor 112 is a component configured such that driving power directly flows in the battery pack connector 100 according to the present disclosure. Accordingly, the power supply conductor 112 may include an electric conducting material, in particular, a metal material such as copper or the like. Also, the power supply conductor 112 may be configured to be embedded inside the power supply housing 111 while both ends are exposed to the outside. For example, referring to FIG. 4, the power supply conductor 112 may be configured such that an end (outer end) in a direction facing the outside of the battery pack (+X-axis direction) and an end (inner end) in a direction facing the inside of the battery pack (−X-axis direction) are exposed to the outside. Accordingly, an external device of the battery pack, for example, an external power supply cable connected to the lead storage battery of the vehicle, may contact and be connected to the outer end of the power supply conductor 112, and the power supply wire w1 inside the battery pack may contact and be connected to the inner end of the power supply conductor 112. Here, the outer end and the inner end may be configured in a form of a terminal to be connected to a wire or a plate. In other words, the outer end of the power supply conductor 112 may be an external terminal of the power supply connecting unit 110 and the inner end of the power supply conductor 112 may be an internal terminal of the power supply connecting unit 110.

In particular, according to the present disclosure, the power supply conductor 112 may be embedded inside the power supply housing 111 including the noise blocking material. In other words, the noise blocking material may surround the vicinity of the power supply conductor 112. Accordingly, noise may be effectively prevented from being transmitted outside the battery pack or flowing into the battery pack through the power supply conductor 112.

Also, one or more power supply conductors 112 may be provided in the power supply connecting unit 110. In particular, as shown in FIGS. 3 and 4, the plurality of power supply conductors 112 may be provided in the power supply connecting unit 110. Also, at least some of the plurality of power supply conductors 112 may be used to transmit driving power to the battery management system. Here, the plurality of power supply conductors 112 may all be embedded inside the power supply housing 111 including the noise blocking material. In other words, the vicinity of all of the plurality of power supply conductors 112 may be surrounded by the noise blocking material.

More preferably, as shown in FIG. 4, at least a portion of the power supply conductor 112 may be bent. This will be described in more detail with reference to FIG. 5.

Figure 5:
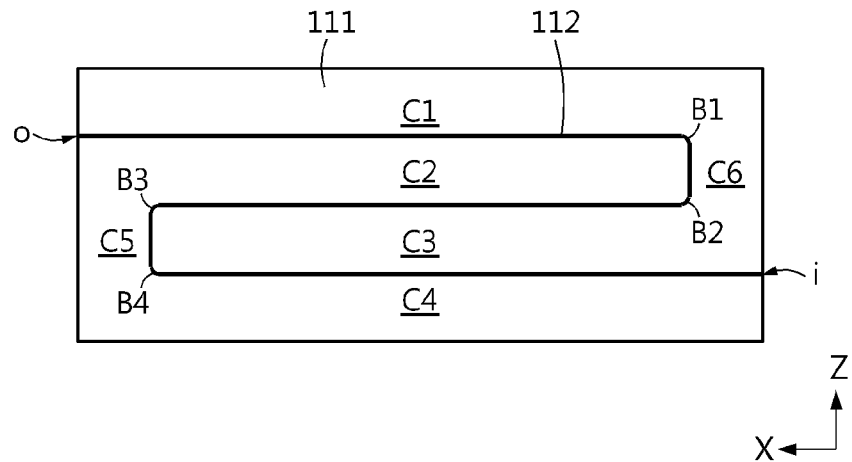
FIG. 5 is a cross-sectional view schematically showing a configuration of a power supply connecting unit, according to an embodiment of the present disclosure.

FIG. 5 is a cross-sectional view schematically showing a configuration of the power supply connecting unit 110, according to an embodiment of the present disclosure. For example, FIG. 5 may be an example of a cross-sectional view taken along a line A-A' of FIG. 4 while the power supply conductor 112 is embedded in the power supply housing 111.

Referring to FIG. 5, the power supply conductor 112 may be bent at least once while being embedded inside the power supply housing 111. In other words, the power supply conductor 112 may be configured such that only an outer end o and an inner end i are exposed to the outside, and a connection path between the outer end o and the inner end i is embedded inside the power supply housing 111. Here, a portion embedded inside the power supply housing 111 may be configured such that portions are bent as indicated by reference numerals B1 through B4.

According to such a configuration of the present disclosure, the path of the power supply conductor 112 embedded inside the power supply housing 111 may be elongated. In other words, the power supply conductor 112 of the battery pack connector 100 according to the present disclosure may be configured such that the path from the outer end o to the inner end i is bent inside the power supply housing 111, instead of being formed short in a linear form. Accordingly, the power supply conductor 112 of the pack connector according to the present disclosure may have a long and complicated path. Here, since the power supply housing 111 includes the noise blocking material, the power supply conductor 112 may have the long path while the vicinity thereof is all surrounded by the noise blocking material. For example, as indicated by reference numerals C1 through C6 in the configuration of FIG. 5, in the power supply conductor 112, except for the outer end o and the inner end i, the all path therebetween may be surrounded by the power supply housing 111, i.e., the noise blocking material. Thus, according to such a configuration of the present disclosure, a noise blocking effect by the noise blocking material may be further improved without having to increase a size of a connector. Moreover, when the power supply connecting unit 110 includes the plurality of power supply conductors 112, all conductors may have such a bent shape.

In particular, in an embodiment in which the power supply conductor 112 is bent as described above, the power supply conductor 112 may be bent at least 90° inside the power supply housing 111.

For example, as shown in FIG. 5, the power supply conductor 112 may be bent approximately at right angles at each of the portions B1, B2, B3 and B4. In this case, the path of the power supply conductor 112 may be changing a proceeding direction. For example, the path of the power supply conductor 112 may be bent to change a direction from a horizontal direction to a vertical direction or from the vertical direction to the horizontal direction. According to such a configuration of the present disclosure, the path of the power supply conductor 112 may be elongated as much as possible inside the power supply housing 111.

Moreover, when the distance between the portions B1 and B2 and the distance between the portions B3 and B4 are short in FIG. 5, the power supply conductor 112 may be bent about 180°. In other words, the power supply conductor 112 may be bent such that the proceeding path is in an opposite direction in at least one portion. According to such a configuration of the present disclosure, the power supply conductor 112 may have a longer length in a narrow space inside the power supply housing 111.

Meanwhile, as described above, the power supply connecting unit 110 may include the plurality of power supply conductors 112. In particular, at least two of the plurality of power supply conductors 112 may be arranged at different locations in the up-and-down direction. This will be described in more detail with reference to FIG. 6.

Figure 6:
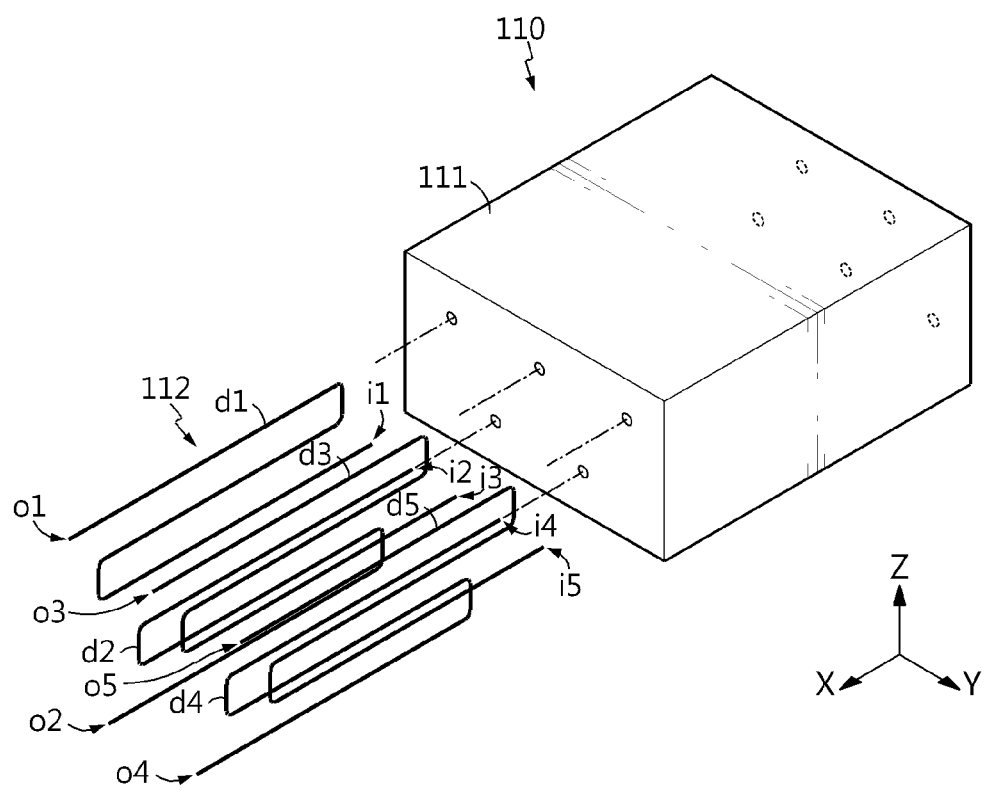
FIG. 6 is a perspective view schematically showing a configuration of a power supply connecting unit of a battery pack connector, according to an embodiment of the present disclosure.

FIG. 6 is a perspective view schematically showing a configuration of the power supply connecting unit 110 of the battery pack connector 100, according to an embodiment of the present disclosure. In FIG. 6, each power supply conductor 112 is exposed outside the power supply housing 111 for convenience of description.

Referring to FIG. 6, the power supply connecting unit 110 includes the plurality of power supply conductors 112, and each of the power supply conductors 112 may all be bent in the up-and-down direction (Z-axis direction in FIG. 6). Here, the power supply conductor 112 being bent in the up-and-down direction may denote that the power supply conductor 112 is bent in an upward direction or a downward direction from the horizontal direction or bent in the horizontal direction from the upward or downward direction. For example, all the power supply conductors 112 may be bent on an X-Z plane of FIG. 6. Here, as shown in FIG. 6, each power supply conductor 112 may be bent in opposite directions at least four times, but the number of bends may vary.

Here, some power supply conductors 112 may be located at different locations in the up-and-down direction. Here, the power supply conductors 112 being located at different locations in the up-and-down direction may denote that heights of outer ends are different. For example, in FIG. 6, an outer end o1 of d1, an outer end o3 of d3, and an outer end o5 of d5 may be located above compared with an outer end o2 of d2 and an outer end o4 of d4. Alternatively, the power supply conductors 112 being located at different locations in the up-and-down direction may denote that heights of highest points of the power supply conductors 112 are different from each other.

As such, the plurality of power supply conductors 112 located at different locations in the up-and-down direction may be each bent in the up-and-down direction. For example, in FIG. 6, each power supply conductor 112, for example, the d1 power supply conductor 112, may be bent such that the path proceeds in the horizontal direction from the outer end o1 towards an inner end i1, bends in the downward direction, and then bends in the horizontal direction again. In other words, the d1 power supply conductor 112 may be bent on any one of X-Z planes.

In such a configuration, the power supply conductors 112 located at different locations in the up-and-down direction may be located at different locations in the horizontal direction, for example, in a left-and-right direction. For example, in FIG. 6, the d2 power supply conductor 112 may be located at different locations from the d1 power supply conductor 112, the d3 power supply conductor 112, and the d5 power supply conductor 112 having different outer end heights, in the left-and-right direction (Y-axis direction of FIG. 6). In other words, one X-Z plane where the d2 power supply conductor 112 is present may be spaced apart from the X-Z plane where the d1 power supply conductor 112 is present, the X-Z plane where the d3 power supply conductor 112 is present, and the X-Z plane where the d5 power supply conductor 112 is present, in the Y-axis direction. Moreover, as shown in FIG. 6, in the horizontal direction, d2 may be located between d1 and d3, and d4 may be located between d3 and d5.

According to such a configuration of the present disclosure, each of the power supply conductors 112 may be bent to have long lengths while not interfering with each other. In other words, according to such a configuration, since power supply conductors 112 are spaced apart from each other by a predetermined distance, the noise blocking material of the power supply housing 111 may be disposed between the power supply conductors 112. Thus, in this case, the length of each of the plurality of power supply conductors 112 may be elongated while all power supply conductors 112 are surrounded by the noise blocking material, thereby securing a noise blocking effect.

Meanwhile, as in the above embodiment, regarding the configuration in which the power supply conductor 112 is bent in the up-and-down direction, heights of an outer end and an inner end of the power supply conductor 112 may be configured to be located at different locations. For example, referring to FIG. 5, several power supply conductors 112 may be configured such that the outer ends o1 through o5 and the inner ends i1 through i5 are not located at the same heights but to be located at different locations in the Z-axis direction.

Moreover, when the plurality of power supply conductors 112 provided in the power supply connecting unit 110 are bent in the up-and-down direction, the outer end and the inner end of each of the power supply conductors 112 may be located such that heights are opposite in the up-and-down direction. For example, referring to the configuration of FIG. 6, in case of d1, d3, and d5 in which the heights of the outer ends are relatively higher, the heights of the inner ends i1, i3, and i5 may be relatively lower than the heights of the inner ends i2 and i4 of d2 and d4. In other words, in case of d1, d3, and d5, the outer ends o1, o3, and o5 are located high and the inner ends i1, i3, and i5 are located low, whereas in case of d2 and d4, the outer ends o2 and o4 are located low and the inner ends i2 and i4 are located high.

According to such a configuration of the present disclosure, a distance between outer ends and a distance between inner ends of the plurality of power supply conductors 112 may be sufficiently secured, while the path of each power supply conductor 112 may be elongated as much as possible. Thus, in this case, a design of a connector and processes of connecting the connector to a wire may be facilitated, while the noise blocking effect may be secured as much as possible.

However, the present disclosure is not limited to such embodiments, and other various embodiments may be realized.

Figure 7:
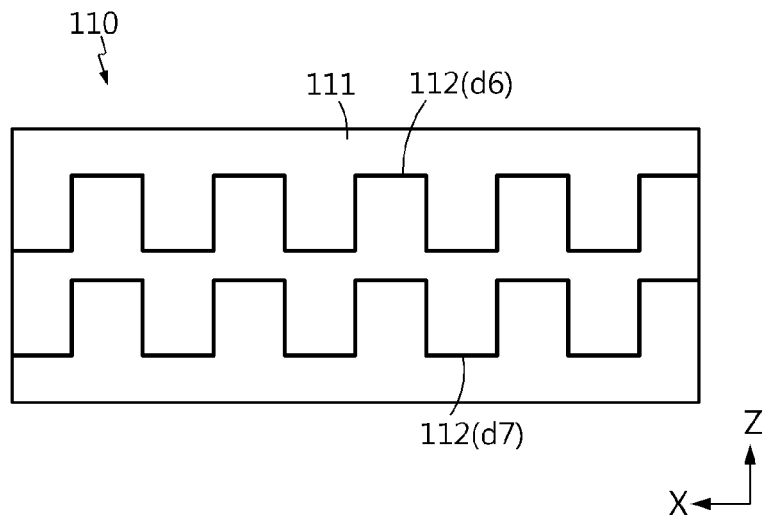
FIG. 7 is a cross-sectional view schematically showing a configuration of a power supply connecting unit, according to another embodiment of the present disclosure.

FIG. 7 is a cross-sectional view schematically showing a configuration of the power supply connecting unit 110, according to another embodiment of the present disclosure. Hereinafter, differences from the above embodiments will be mainly described, and details to which the same or similar descriptions as the above embodiments are applicable will be omitted.

Referring to FIG. 7, the plurality of power supply conductors 112 may be provided inside the power supply housing 111. In particular, at least two of the plurality of power supply conductors 112 may be bent to have uneven portions. For example, the configuration of FIG. 7 shows two power supply conductors 112 (d6 and d7) arranged in the up-and-down direction, and such two power supply conductors 112 (d6 and d7) may be each bent to have an uneven portion. In particular, the uneven portion of each power supply conductor 112 may have a shape of square waves including straight lines in the horizontal direction and straight lines in the vertical direction.

According to such a configuration of the present disclosure, by elongating the path of the power supply conductor 112 inside the power supply housing 111, a large portion of the power supply conductor 112 may be surrounded by the noise blocking material. Thus, in this case, a blocking effect with respect to noise passing through the power supply conductor 112 may be largely secured.

Figure 8:
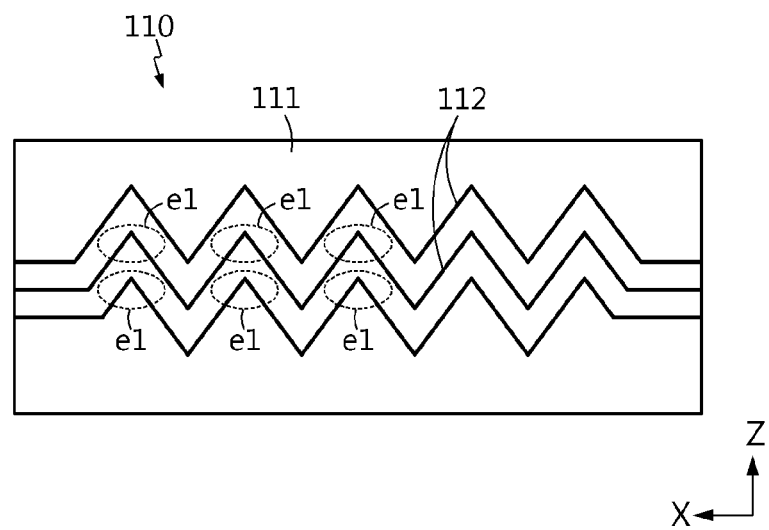
FIGS. 8 and 9 are cross-sectional views schematically showing a configuration of a power supply connecting unit, according to other embodiments of the present disclosure.
Figure 9:
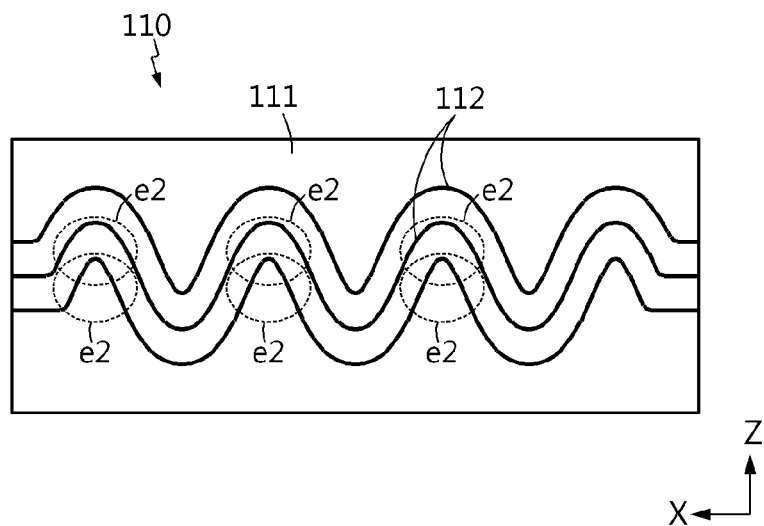

FIGS. 8 and 9 are cross-sectional views schematically showing a configuration of the power supply connecting unit 110, according to other embodiments of the present disclosure.

First, referring to FIG. 8, at least three power supply conductors 112 arranged in the up-and-down direction inside the power supply housing 111 are provided, and each power supply conductor 112 may be bent to have an uneven portion. Here, the uneven portion of each power supply conductor 112 may include a diagonal line at least partially. In other words, the uneven portion of the power supply conductor 112 not only includes a segment in the horizontal direction or the vertical direction as shown in FIG. 7, but also includes a segment inclined at a predetermine angle within 90° in the horizontal direction. In the embodiment of FIG. 8, the uneven portion of the power supply conductor 112 includes a shape of triangle waves.

Then, referring to FIG. 9, with respect to the three power supply conductors 112 arranged in the up-and-down direction inside the power supply housing 111, the uneven portion may include a shape of curves at least partially. In particular, the uneven portion of the power supply conductor 112 may include a shape of sine waves.

In particular, as shown in such configurations of FIGS. 8 and 9, the uneven portion of at least one power supply conductor 112 may be inserted into the uneven portion of the other power supply conductor 112.

For example, in the embodiment of FIG. 8 in which at least a portion of the power supply conductor 112 has the shape of triangle waves, the triangle waves of at least one power supply conductor 112 may be inserted into the triangle waves of the other power supply conductor 112. In particular, as indicated by regions e1 in FIG. 8, the power supply conductors 112 located at the middle and the bottom may respectively have vertices inserted inside regions of the triangle waves of the power supply conductors 112 located at the top and the middle, which face upward.

Also, in the embodiment of FIG. 9 in which at least a portion of the power supply conductor 112 has a shape of sine waves, the sine waves of at least one power supply conductor 112 may be inserted into the sine waves of the other power supply conductor 112. In particular, as indicated by regions e2 in FIG. 9, the power supply conductors 112 located at the middle and the bottom may respectively be inserted into the bottoms of regions of the sine waves of the power supply conductor 112 located at the top and the middle, which are convex upward.

According to such a configuration of the present disclosure, the length of the power supply conductor 112 may be easily elongated inside the power supply housing 111. Moreover, the locations in the horizontal direction may not be restricted with respect to the plurality of power supply conductors 112 having different heights in the up-and-down direction. For example, the three power supply conductors 112 located at different locations in the up-and-down direction in the configuration of FIG. 8 or 9 may be located at the same location in the horizontal direction (Y-axis direction in FIG. 3). According to such a configuration, even when the plurality of power supply conductors 112 having different heights are bent in the up-and-down direction while being located at the same location in the horizontal direction, the lengths thereof may be elongated without interfering with each other. Thus, in this case, a structure of a connector is not complicated, manufacturing processes are simplified, and it is easy to elongate a length as much as possible. Moreover, in this case, the shapes of the plurality of power supply conductors 112 may be identical and not be different, and thus simplification of the manufacturing processes and structures may be further facilitated.

Meanwhile, in the above embodiments, the power supply conductor 112 is bent two-dimensionally on one plane, but the present disclosure is not necessarily limited to such embodiments.

Figure 10:
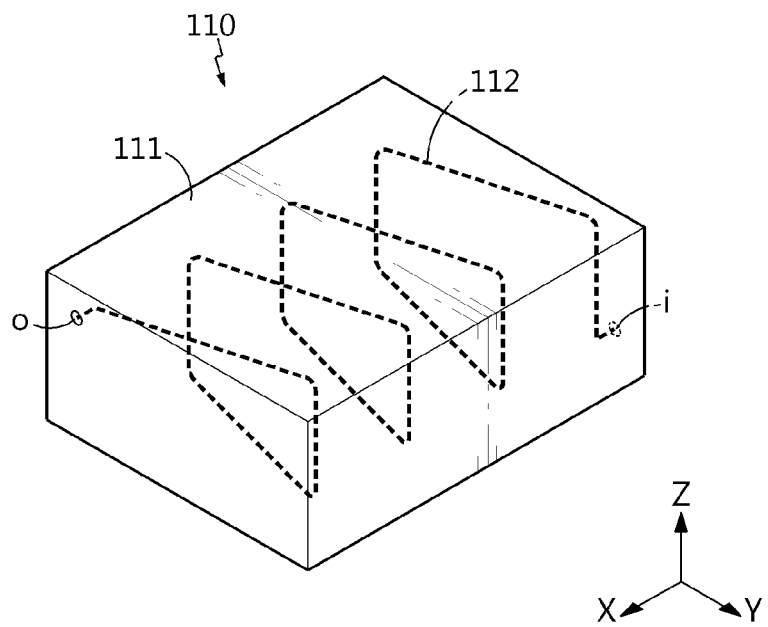
FIG. 10 is a transparent perspective view schematically showing at least a partial configuration of a power supply connecting unit, according to another embodiment of the present disclosure.

FIG. 10 is a transparent perspective view schematically showing at least a partial configuration of the power supply connecting unit 110, according to another embodiment of the present disclosure.

Referring to FIG. 10, the power supply conductor 112 may be bent three-dimensionally inside the power supply housing 111. In other words, the power supply conductor 112 may not be located on one plane, but may be located in a 3-dimensional (3D) space. In particular, the power supply conductor 112 may be bent in a shape of a spring. For example, the power supply conductor 112 may have a spiral form.

According to such a configuration of the present disclosure, since the power supply conductor 112 is bent in the 3D space, it may be further facilitated to form the power supply conductor 112 to have a longer length. Accordingly, the noise blocking effect by the power supply housing 111 may be further improved.

Moreover, the power supply conductor 112 may be wound not in a curve but in a straight line. For example, as shown in FIG. 10, the power supply conductor 112 may be entirely embedded inside the power supply housing 111 except for the outer end o and the inner end i, while surrounding an outer surface of an arbitrary rectangular parallelepiped present inside the power supply housing 111.

According to such a configuration of the present disclosure, the length of the power supply conductor 112 may be further elongated compared to when the power supply conductor 112 has curves. Accordingly, a blocking effect of noise passing through the power supply conductor 112 may be further enhanced.

Meanwhile, in FIG. 10, only one power supply conductor 112 is shown for convenience of description, but as described above, the plurality of power supply conductors 112 may be included inside the power supply housing 111. An embodiment of such a form will be described in detail with reference to FIG. 11.

Figure 11:
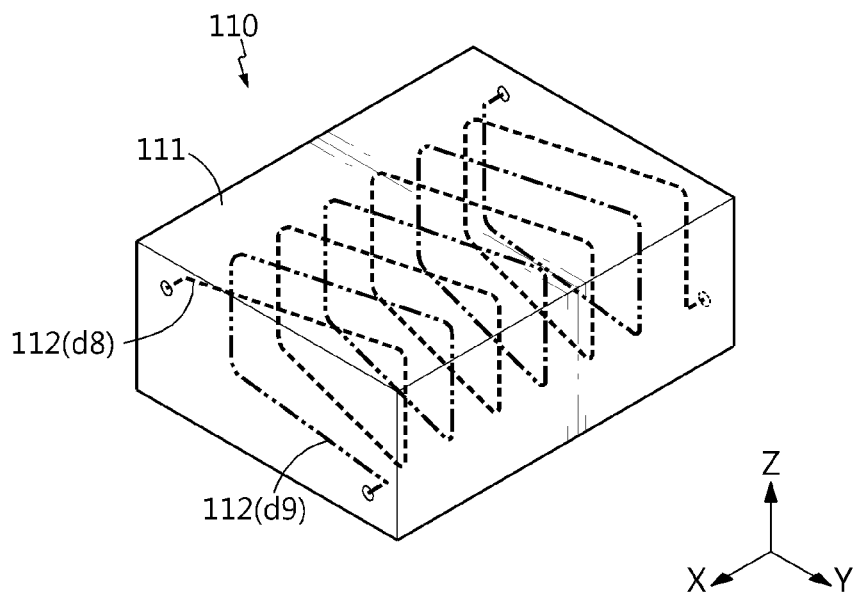
FIG. 11 is a transparent perspective view schematically showing a configuration of a power supply connecting unit, according to another embodiment of the present disclosure.

FIG. 11 is a transparent perspective view schematically showing a configuration of the power supply connecting unit 110, according to another embodiment of the present disclosure. Hereinafter, differences from the previous embodiments, in particular, the embodiment of FIG. 10, will be mainly described.

Referring to FIG. 11, the plurality of power supply conductors 112 may be embedded inside the power supply housing 111, and each power supply conductor 112 may have an outer end at a front end of the power supply housing 111 and an inner end at a rear end of the power supply housing 111. Also, each power supply conductor 112 may be wound in a shape of a spring. For example, the two power supply conductors 112 (d8 and d9) shown in FIG. 11 may wound one arbitrary rectangular parallelepiped. In FIG. 11, the d8 power supply conductor is shown in a dashed line and the d9 power supply conductor is shown in an alternate long and two short dashed line such that the two power supply conductors (d8 and d9) are easily distinguished from each other.

In this case, the plurality of power supply conductors 112 may be configured such that the springs are mutually inserted. In other words, in the configuration of FIG. 11, the two power supply conductors 112 indicated by d8 and d9 may approximately overlap each other based on the power supply connecting unit 110 viewed from the front or the back (when viewed in the X-axis direction in FIG. 11). In other words, on the Y-Z plane, the d8 power supply conductor 112 and the d9 power supply conductor 112 may have the same or similar shape at approximately the same or similar location. However, the d8 power supply conductor 112 and the d9 power supply conductor 112 may alternately located at different locations based on the power supply connecting unit 110 viewed from the left or the right (when viewed in the Y-axis direction in FIG. 11). For example, the two power supply conductors 112 may be sequentially and alternately located in an order of the d8 power supply conductor 112, the d9 power supply conductor 112, the d8 power supply conductor 112, the d9 power supply conductor 112, and so on, based on a portion elongated in the up-and-down direction, on the X-Z plane.

According to such a configuration of the present disclosure, in the configuration in which the plurality of power supply conductors 112 are included in the power supply connecting unit 110, each of the power supply conductors 112 may be embedded as long as possible without interfering with each other inside the power supply housing 111. Accordingly, in this case, a noise filtering effect of the power supply connecting unit 110 may be further improved.

Figure 12:
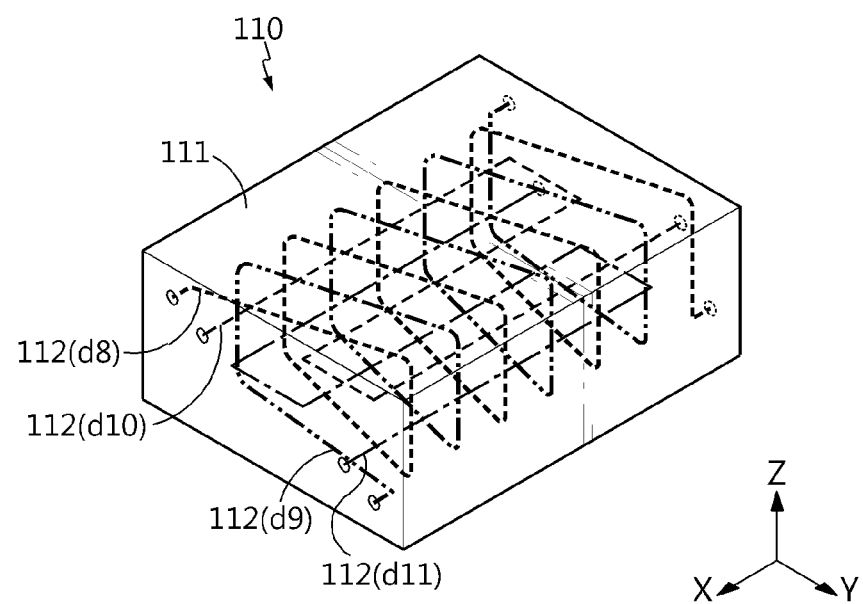
FIG. 12 is a transparent perspective view schematically showing a configuration of a power supply connecting unit, according to another embodiment of the present disclosure.

FIG. 12 is a transparent perspective view schematically showing a configuration of the power supply connecting unit 110, according to another embodiment of the present disclosure. Herein as well, differences from the previous embodiments, in particular, the embodiment of FIG. 11 will be mainly described.

Referring to FIG. 12, the power supply connecting unit 110 may include both the three-dimensionally bent power supply conductor 112 and the two-dimensionally bent power supply conductor 112.

More particularly, referring to FIG. 12, the power supply conductors 112 indicated by d8 and d9 may be bent three-dimensionally, in particular, bent in a shape of a spring. Also, the power supply conductor 112 indicated by d10 and d11 may be bent two-dimensionally, in particular, bent in the horizontal direction on the X-Y plane.

In such a configuration, the two-dimensionally bent power supply conductor 112 may be inserted into the three-dimensionally bent power supply conductor 112. In other words, the d8 power supply conductor 112 and the d9 power supply conductor 112 may be formed in the shape of a spring and have a space similar to a hollow therein. At this time, the d10 power supply conductor 112 and the d11 power supply conductor 112 may be bent in the horizontal direction inside the power supply conductor 112 of such a shape of a spring. Meanwhile, unlike as shown in FIG. 12, the d10 power supply conductor 112 and the d11 power supply conductor 112 may be bent in the vertical direction inside the power supply conductor 112 of the shape of a spring.

According to such a configuration of the present disclosure, by variously forming bent shapes of the power supply conductor 112 inside the power supply housing 111, all conductors may secure longest length possible while the power supply conductors 112 are sufficiently spaced apart from each other without interfering with each other. Thus, in this case, the noise blocking effect of the power supply connecting unit 110 may be further improved.

Preferably, the communication connecting unit 120 may include a communication housing 121 and a communication conductor 122 as shown in FIGS. 3 and 4.

The communication housing 121 may include an electric insulating material such as not to be electrically conducted with the communication conductor 122 therein. In particular, the communication housing 121 may include a polymer material, such as plastic or the like.

Such a communication housing 121 includes the communication conductor 122 therein, and may have various shapes to surround the communication conductor 122. For example, as shown in FIG. 4, the communication housing 121 may have an approximately rectangular parallelepiped shape. However, the communication housing 121 may have any other various shapes.

The communication conductor 122 is a component enabling a communication signal to be transmitted via the battery pack connector 100 according to the present disclosure. Accordingly, the communication conductor 122 may include an electric conductive material, in particular, a metal material such as copper or the like. Also, the communication conductor 122 may be embedded inside the communication housing 121 and have both ends exposed to the outside. For example, in the configuration of FIG. 4, the communication conductor 122 may have one end (outer end) exposed at the front (+X-axis direction) facing the outside of the pack connector and the other end (inner end) exposed at the back (−X-axis direction) facing the inside of the pack connector. Accordingly, the external device of the battery pack, for example, an external communication cable, such as a CAN line connected to the ECU of the vehicle, may contact and be connected to the outer end of the communication conductor 122. Also, the communication wire w2 inside the battery pack connected to the battery management system or the like may contact and be connected to the inner end of the communication conductor 122. The outer end and the inner end of the communication conductor 122 may also be in a form of a terminal to be connected to a wire or a plate.

One or more communication conductors 122 may be provided in the communication connecting unit 120. In particular, as shown in FIGS. 3 and 4, the plurality of communication conductors 122 may be provided in the communication connecting unit 120. Also, the plurality of communication conductors 122 may be used to transmit communication data.

In particular, with respect to the battery pack connector 100 according to the present disclosure, the communication housing 121 may not include the noise blocking material unlike the power supply housing 111. In other words, in the battery pack connector 100 according to the present disclosure, the power supply connecting unit 110 may include the noise blocking material and the communication connecting unit 120 may not include the noise blocking material.

According to such a configuration of the present disclosure, a change of a communication signal transmitted through the communication wire w2 may be prevented or reduced by the noise blocking material. In case of a communication wire, such as a CAN line, quick switching may occur in angular waveform shapes between a high voltage and a low voltage. However, the noise blocking material may slow down the quick switching with respect to the communication signal and impair the angular waveform shapes. Thus, by configuring the communication connecting unit 120 to not include the noise blocking material as the above configuration of the present disclosure, an adverse effect, such as deformation or distortion, of communication data may be prevented.

Also, in the battery pack connector 100 according to the present disclosure, the communication conductor 122 may have a linear shape. For example, referring to FIG. 4, the communication conductor 122 may not be bent, but may be linear extending in a front-and-back direction (X-axis direction of FIG. 4) of the battery pack connector 100, i.e., in a direction from the outside to the inside of the battery pack.

In particular, according to one configuration of the present disclosure, the power supply conductor 112 may be bent inside the power supply housing 111 whereas the communication conductor 122 may not be bent but may extend straight inside the communication housing 121.

According to such a configuration of the present disclosure, interference of the noise blocking material of the power supply connecting unit 110 may be minimized, thereby enabling the communication signal to be accurately transmitted by the communication conductor 122. In other words, according to an embodiment of the present disclosure, the communication connecting unit 120 may be located adjacent to the power supply connecting unit 110 and the power supply connecting unit 110 may include the noise blocking material, and here, by configuring the shape of the communication conductor 122 provided in the communication connecting unit 120 to be short, damage or distortion of a signal by the adjacent noise blocking material may be minimized.

Also, as shown in FIG. 4, the power supply connecting unit 110 and the communication connecting unit 120 may be spaced apart from each other by a predetermined distance. In particular, the communication housing 121 of the communication connecting unit 120 may be spaced apart from the power supply housing 111 of the power supply connecting unit 110 by the predetermined distance without a direct contact. In this case, it is possible to reduce that the communication conductor 122 embedded inside the communication housing 121 is influenced by the power supply housing 111.

Also, the battery pack connector 100 according to the present disclosure may further include a connector case 130 as shown in FIGS. 3, 4, and the like.

The connector case 130 may be combined with the communication connecting unit 120 and/or the power supply connecting unit 110. Here, a combining form of the connector case 130 to each connecting unit may vary. For example, the connector case 130 may include an internal space as shown in FIGS. 3 and 4, and may be configured such that the communication connecting unit 120 and/or the power supply connecting unit 110 may be inserted and accommodated in the internal space. Alternatively, the connector case 130 and each connecting unit may be combined and fixed to each other via a coupling member, such as a bolt and a nut. In addition, the connector case 130 and the communication connecting unit 120 and/or the power supply connecting unit 110 may be combined via various methods, and the present disclosure is not limited by a specific method.

The connector case 130 may include a polymer material such as plastic. However, the connector case 130 may include other various materials.

Figure 13:
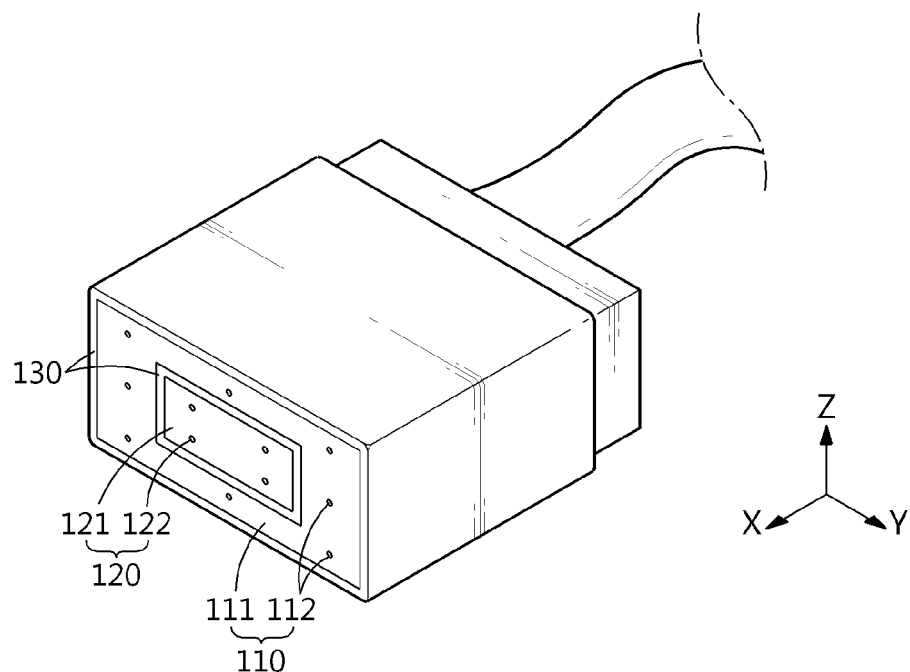
FIG. 13 is a perspective view schematically showing a configuration of a battery pack connector, according to another embodiment of the present disclosure.
Figure 14:
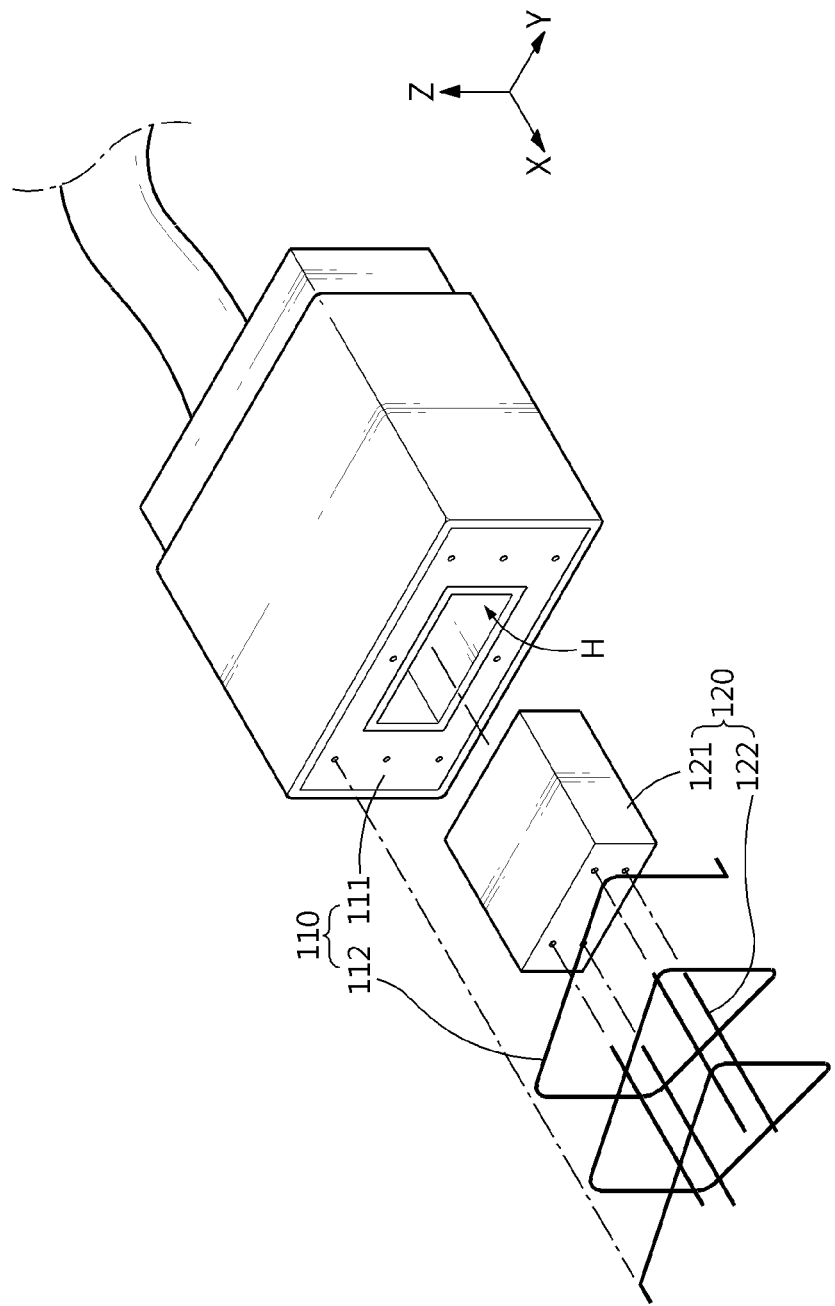
FIG. 14 is an exploded perspective view of a partial configuration of FIG. 13.

FIG. 13 is a perspective view schematically showing a configuration of the battery pack connector 100, according to another embodiment of the present disclosure, and FIG. 14 is an exploded perspective view of a partial configuration of FIG. 13. In particular, in FIG. 14, only four communication conductors 122 and one power supply conductor 112 are extracted outside the power supply housing 111 and disposed for convenience of description. In addition, differences from the previous embodiments will be mainly described.

Referring to FIGS. 13 and 14, the communication connecting unit 120 may be inserted into the power supply connecting unit 110. In particular, the communication connecting unit 120 may be located at a center portion of the battery pack connector 100, and the power supply connecting unit 110 may be configured to surround the vicinity of such a communication connecting unit 120. More specifically, the power supply connecting unit 110 may have an internal space, for example, a hollow, as indicated by a reference numeral H in FIG. 14. Also, the battery pack connector 100 may be configured such that the communication connecting unit 120 is inserted into the internal space of the power supply connecting unit 110.

According to such a configuration of the present disclosure, configuring the length of the communication conductor 122 of the communication connecting unit 120 to be short and configuring the length of the power supply conductor 112 of the power supply connecting unit 110 to be long may be easily achieved. In such a configuration, the size or volume of the power supply connecting unit 110 located outside may be larger than the size or volume of the communication connecting unit 120 located inside. Accordingly, the length of the power supply conductor 112 located inside the power supply connecting unit 110 may be much longer than the length of the communication conductor 122 located inside the communication connecting unit 120. Accordingly, the blocking effect of noise passing through the power supply conductor 112 may be increased by lengthening the length of the power supply conductor 112 inside the noise blocking material, while the distortion or damage to the communication signal with respect to the communication conductor 122 may be prevented by shortening the length of the communication conductor 122.

In particular, in such a configuration, the communication conductor 122 may have a linear shape and the power supply conductor 112 may have a shape turning around the communication conductor 122, for example, a shape of a spring. In this case, when the plurality of power supply conductors 112 are included in the power supply connecting unit 110, each of the power supply conductors 112 may be inserted without overlapping each other as described above in the embodiment of FIG. 11. In other words, the power supply conductors 112 of the shape of a spring may be alternately located in the front-and-back direction.

Hereinafter, effects of the present disclosure will be described in more detail with reference to examples and comparative examples. It should be understood, however, that the examples of the present disclosure may be embodied in many different forms and should not be construed as limited to the examples set forth herein. The examples of the present disclosure are provided to enable one of ordinary skill in the art to more fully understand the present disclosure.

EXAMPLE 1

A battery pack was prepared in the same shape as shown in FIGS. 1 and 2. Moreover, a pack connector of such a battery pack was manufactured to include a power supply connecting unit and a communication connecting unit mostly in the similar shape as shown in FIGS. 3 and 4. In particular, the power supply connecting unit was prepared to include a power supply housing and a power supply conductor as the power supply connecting unit shown in FIG. 4, and to have the rectangular parallelepiped shape. Here, the power supply housing was manufactured to include a ferrite material. Also, an overall size of the battery pack connector was prepared such that the width (length in Y-axis direction of FIG. 4), length (length in the X-axis direction of FIG. 4), and height (length in the Z-axis direction of FIG. 4) are respectively about 10 cm, 8 cm, and 4 cm. Also, a size of the power supply housing was prepared such that the width, length, and height are respectively about 5 cm, 8 cm, and 3 cm. Also, the eight power supply conductors included a copper material and were inserted into the power supply housing. However, the power supply conductor did not include a curved portion unlike FIG. 4, but was linear, and the length (X-axis direction of FIG. 4) thereof was about 8 cm.

EXAMPLE 2

A battery pack was prepared in the same material and the same shape as the battery pack of Example 1, except for a shape of a power supply conductor. In particular, the power supply conductor of a connector applied to the battery pack of Example 2 was bent in opposite directions two times inside a housing as shown in FIGS. 4 and 5. Here, a length of the power supply conductor was about 22 cm.

COMPARATIVE EXAMPLE

A battery pack was manufactured in the same material and the same shape as that of Example 1, except for a material of a power supply housing in a pack connector. In particular, in the battery pack of Comparative Example, the power supply housing of the connector included a plastic material, in particular, a polybutylene terephthalate (PBT) material.

Figure 15:
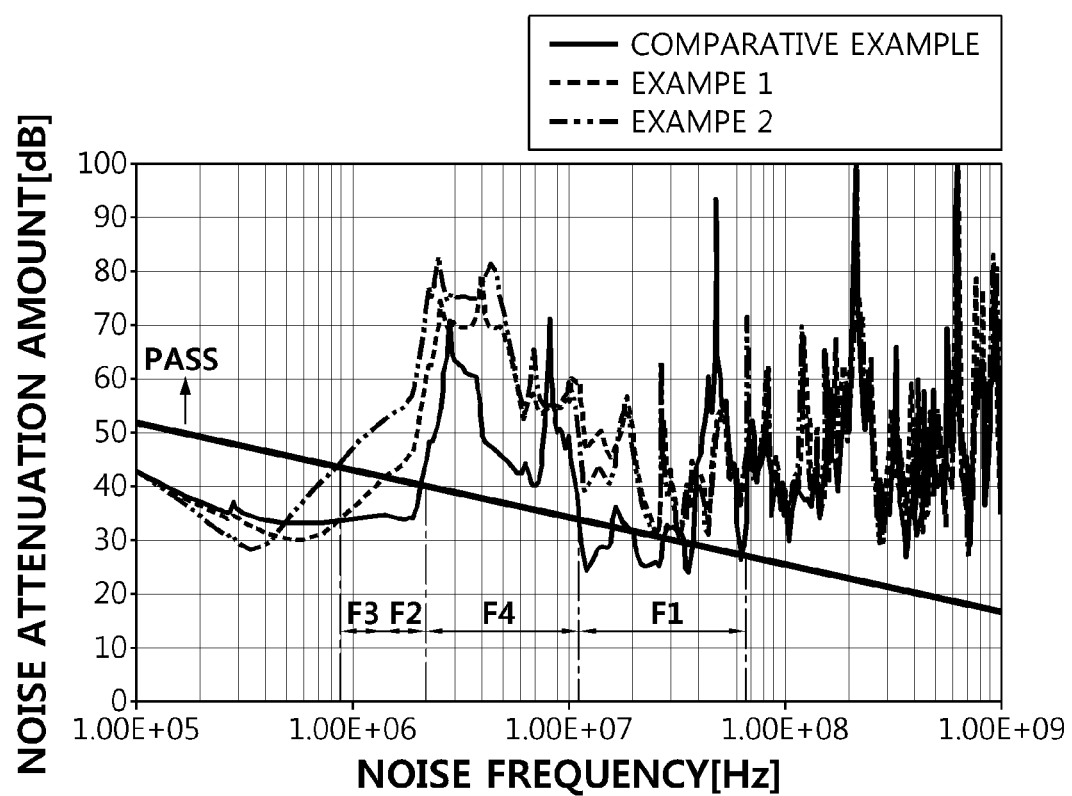
FIG. 15 is a graph showing a result of measuring a noise attenuation amount according to examples of the present disclosure and a comparative example.

With respect to each of the battery packs of Examples 1 and 2 and Comparative Example, noise was applied to an internal high current end of the battery pack through a positive terminal (a terminal of a portion indicated by + in the drawing) and a negative terminal (a terminal of a portion indicated by − in the drawing) of the battery pack. In this case, the noise may propagate to an adjacent cable and circuit in the battery pack, and escape to the power supply connecting unit of the battery pack connector. Thus, the applicant measured the noise at the power supply connecting unit by using a noise measurement device (Network Analyzer) with respect to the battery packs of each Example and Comparative Example. In particular, a noise attenuation amount according to a change of a noise frequency was measured for each Example and Comparative Example, and a result thereof was shown in FIG. 15. In other words, FIG. 15 is a graph showing a result of measuring a noise attenuation amount according to several Examples of the present disclosure and Comparative Example. Also, a reference value of noise with respect to a connector is indicated as 'PASS' in FIG. 15.

Referring to FIG. 15, it is verified that an effect of attenuation of noise is excellent in Examples 1 and 2 of the present disclosure compared to Comparative Example. For example, in a section indicated by reference numeral F1 in the drawing, Comparative Example 1 may be determined to FAIL because the noise attenuation amount is lower than a reference line (PASS line), but Examples 1 and 2 may be determined to PASS because the noise attenuation amounts are higher than the reference line. Accordingly, it may be determined that PASS regions of Examples 1 and 2 are enlarged more than that of Comparative Example.

Also, in Example 1, the noise attenuation amount was measured to be higher than the reference line in a section F2. On the other hand, in Comparative Example, the noise attenuation amount was measured to be lower than the reference line in the section F2. Accordingly, it may be determined that the PASS region of Example 1 is enlarged more by the section F2 than that of Comparative Example.

Also, in Example 2 as well, the PASS region is formed because the noise attenuation amount was measured to be higher than the reference line in the section F2.

Thus, referring to such results of measurement, it may be determined that a noise attenuation effect is further improved when the noise blocking material such as ferrite or the like is used as a housing in which a conductor is embedded, as in the present disclosure, compared to when a plastic material is used.

Moreover, in Example 2, the noise attenuation amount was measured to be higher than the reference line not only in the section F2, but also in a section F3. In such a section F3, not only Comparative Example, but also Example 1 had the noise attenuation amount lower than the reference line. Accordingly, in Example 2, it may be determined that the PASS region is larger than Comparative Example, as well as further larger than Example 1. Also, not only in the sections F2 and F3, but also in a section F4, the noise attenuation amount of Example 2 was higher than the noise attenuation amount of Example 1 in overall.

Accordingly, referring to such results of measurement, it may be determined that, even when a conductor is embedded in a same noise blocking material, a noise blocking effect is further excellent when the conductor is bent and embedded inside the noise blocking material compared to when the conductor is not bent.

The battery pack according to the present disclosure includes the battery pack connector 100 according to the present disclosure. In particular, the battery pack according to the present disclosure may include the battery pack connector 100 according to the present disclosure at the pack case and the battery pack connector 100 may be exposed to the outside, as shown in FIG. 2. Also, the battery pack according to the present disclosure may further include, in addition to the battery pack connector 100, a cell assembly, a pack case, and a battery management system, as described above. In particular, in the battery pack according to the present disclosure, the battery pack connector 100 may be a connector configured to supply power to the battery management system and communicate with the battery management system.

The battery pack according to the present disclosure may be applied to a vehicle, such as an electric vehicle or a hybrid vehicle. In other words, the vehicle according to the present disclosure may include the battery pack according to the present disclosure. In particular, the vehicle according to the present disclosure may include the battery pack to which the battery pack connector 100 according to the present disclosure is applied. In particular, the electric vehicle or the like may include an inverter or the like, and when the battery pack connector of the present disclosure is mounted, noise generated by the inverter or the like may be effectively prevented from flowing into the battery pack or from being transmitted to another electronic device of the vehicle through the battery pack.

In the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

LIST OF REFERENCE NUMERALS

100: Battery Pack Connector
110: Power Supply connecting unit
111: Power Supply Housing, 112: Power Supply Conductor
120: Communication connecting unit
121: Communication Housing, 122: Communication Conductor
130: Connector Case
200: Cell Assembly
210: Secondary Battery, 220: Cartridge
300: Pack Case
310: Upper Case, 320: Lower Case

What is claimed is:

1. A battery pack connector located in a pack case of a battery pack including a battery management system, the battery pack connector comprising:
   a communication connector configured to be connected to a communication wire for exchanging information with the battery management system;
   a power supply connector configured to be connected to a power supply wire for supplying driving power to the battery management system, wherein an interior space of the power supply connector is filled with a noise blocking material; and
   at least a first power supply conductor extending through the noise blocking material in the interior space of the power supply conductor.

2. The battery pack connector of claim 1, wherein the power supply connector comprises:
   a power supply housing including the noise blocking material, and
   wherein the first power supply conductor includes a metal material having a first end and a second end exposed to an outside of the power supply housing.

3. The battery pack connector of claim 2, wherein the first power supply conductor is bent at least once inside the power supply housing.

4. The battery pack connector of claim 3, wherein the first power supply conductor is bent at least 90° inside the power supply housing.

5. The battery pack connector of claim 3, wherein the power supply connector comprises at least a second power supply conductor, wherein the first and second power supply conductors are arranged at different locations in an up-and-down direction, wherein each of the first and second power supply conductors is bent in the up-and-down direction and located at different locations in a horizontal direction.

6. The battery pack connector of claim 3, wherein the power supply connector comprises at least a second power supply conductor inside the power supply housing, wherein the first and second power supply conductors have bent shapes to form uneven portions.

7. The battery pack connector of claim 3, wherein the first power supply conductor is bent three-dimensionally inside the power supply housing.

8. The battery pack connector of claim 1, wherein the communication connector comprises:
   a communication housing including a polymer material, and
   at least one communication conductor including a metal material, embedded inside the communication housing, and having a first end and a second end exposed to an outside of the communication housing.

9. A battery pack comprising the battery pack connector according to claim 1.

10. A vehicle comprising the battery pack according to claim 9.

11. The battery pack connector of claim 1, wherein the power supply connector and the communication connector are adjacent to one another, and wherein the noise blocking material is positioned within the power supply connector and not within the communication connector.

12. The battery pack connector of claim 1, wherein the power supply connector includes at least a second power supply conductor embedded in the noise blocking material, and wherein the noise blocking material is disposed between the first and second power supply conductors.

13. The battery pack connector of claim 1, wherein the noise blocking material is an electric insulating material.

14. The battery pack connector of claim 13, wherein the electric insulating material is a ferrite core material.

15. The battery pack connector of claim 2, wherein the noise blocking material is configured to block electrical noise from flowing from the first end to the second end of the first power supply conductor.

16. The battery pack connector of claim 2, wherein a length of the first power supply conductor within the power supply housing is at least twice as long as a distance between the first and second ends.

17. The battery pack connector of claim 1, wherein the first power supply conductor traverses through the power supply housing according to a wave pattern.

18. The battery pack connector of claim 17, wherein the wave pattern is one of: triangle waves; sine waves; or spirals.

\* \* \* \* \*